Patented Aug. 5, 1924.

1,504,060

UNITED STATES PATENT OFFICE.

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK.

TRIPHENYLMETHANE DYES.

No Drawing.   Application filed March 10, 1922.   Serial No. 542,748.

*To all whom it may concern:*

Be it known that I, LUCAS P. KYRIDES (whose name was changed by judicial decree from LUCAS P. KYRIAKIDES), a citizen of the United States, residing at Buffalo, in the county of Erie, State of New York, have invented certain new and useful Improvements in Triphenylmethane Dyes; and I do hereby declare the following to be a full, clear, and exact description of the invention, such as will enable others skilled in the art to which it appertains to make and use the same.

This invention relates to new dyes which belong to the triphenylmethane group and which are of value for dyeing wool, silk and other animal fibres, and as a union dye for fabrics composed of various mixtures of these fibres. The new dyestuffs are also capable of forming lakes. The invention includes also the dyed fabrics, or other material, dyed with the new dyestuffs.

The new dyestuffs can be obtained by the condensation of derivatives of p.p'-diaminodiphenylmethane with beta-hydroxyethyl derivatives of aromatic amines in the presence of an oxidizing medium. The new dyestuffs in the free state have the following probable formula:

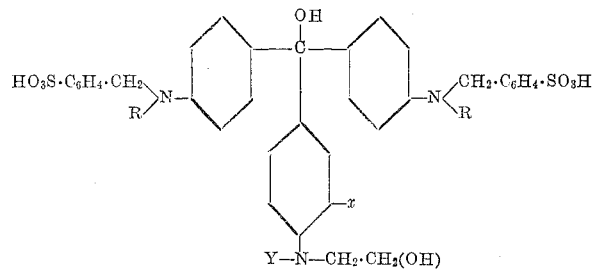

in which R denotes an alkyl radical, $x$ a hydrogen or an alkyl group, and Y a hydrogen or an alkyl or a beta-hydroxyethyl radical.

The following specific examples will illustrate the invention, but it is understood that the invention is not limited thereto.

Example 1: 30 kilos of diethyldibenzyldiaminodiphenylmethane disulphonic acid are dissolved in 250 liters of hot water containing about 3.64 kilos of caustic soda. The solution thus obtained should give a faint alkaline reaction with phenolphthalein as indicator. The solution is diluted with ice-water (ice and water) to about 500 liters, cooled to about 20 C., and while being vigorously agitated, there is added to it a solution of 15.0 kilos of sodium dichromate in 50 liters of water at 20° C. Then a solution of 7.7 kilos beta-hydroxyethyl-o-toluidine dissolved in 22 liters of sulfuric acid, sp. gr. 1.095, is added, the mixture diluted to about 600 liters and vigorously agitated at room temperature for about 18 hours, or until the reaction is completed. When the reaction is complete, the precipitate is separated by filtration and from the filtrate the dye is precipitated either by the addition of common salt (preferably at 10° C.) or of sodium sulfate (preferably at 35° C.). The dye is filtered off and dried.

Example 2: The initial materials, the specific conditions, and the procedure are the same as given in Example 1, except 7.0 kilos of beta-hydroxyethylaniline are substituted in place of the 7.7 kilos of the beta-hydroxyethyl-o-toluidine.

The new dyestuffs produced as described above, in the form of their sodium salts and in the dry and powdered state, are bronze-colored powders with a violet tinge. They are easily soluble in water with a reddish violet color which solution remains unchanged by the addition of a little caustic alkali but turns to a blue color upon the addition of a little hydrochloric acid. They are less soluble in alcohol than in water, and are insoluble in ether. They dissolve in concentrated sulfuric acid to an orange-yellow color which solution upon dilution with water passes to a green, and finally, upon further dilution, to a blue color, the dye remaining in solution.

The new dyestuffs dye wool, silk, and other animal fibres, as well as union fabrics composed in whole or in part of these fibres, producing in general reddish violet shades which are fast to washing and to fulling. Union fabrics composed of cotton and wool exhaust well in a neutral bath and leave the cotton substantially unstained.

The dyed materials produced by the action of the dyestuffs themselves or lakes thereof on the fibre or fabric, as well as the new dyestuffs themselves or lakes thereof, form a part of the present invention.

I claim:

1. As new products, the herein described new dyestuffs having in the free state the following probable formula:

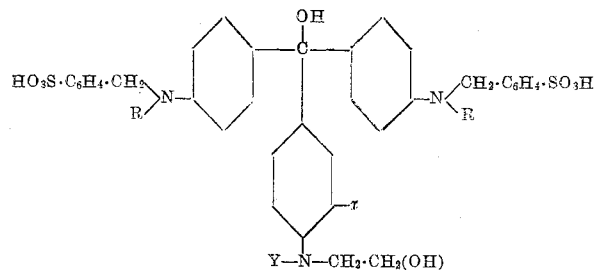

wherein R denotes an alkyl group, $x$ either hydrogen or an alkyl group, and Y either hydrogen or an alkyl or a beta-hydroxyethyl group, said products, in the form of their sodium salts and in the dry and powdered state, being bronze colored powders easily soluble in water to give reddish violet solutions which remain unchanged by dilute alkali but give a blue color with dilute hydrochloric acid, less soluble in alcohol, insoluble in ether, soluble in concentrated sulfuric acid giving orange-yellow solutions which upon dilution with water first give green and, finally, blue shades, the dye remaining in solution.

2. As a new product, the herein described new dyestuff having in the free state the following probable formula:

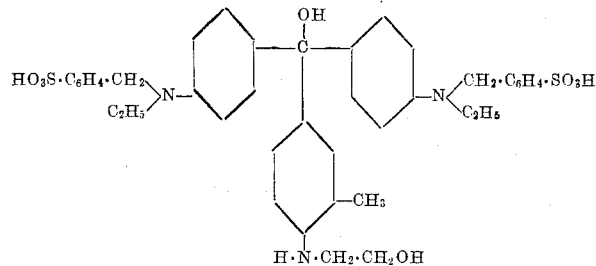

said dye, in the form of its sodium salt and in the dry and powdered state, being a bronze colored powder with a violet tinge, easily soluble in water to give a reddish violet colored solution which is not changed by dilute alkalis but changes to a blue color by the addition of dilute hydrochloric acid, less soluble in alcohol, soluble in concentrated sulfuric acid with an orange-yellow color which upon the addition of water changes to a green color and, finally, to a blue color, the dye remaining in solution; and dyeing wool and other animal fibres, or mixtures of the same, reddish violet shades.

3. Materials dyed with the new dyestuffs of claim 1.

4. Materials dyed with the new dyestuff of claim 2.

In testimony whereof I affix my signature.

LUCAS P. KYRIDES.